Patented Sept. 27, 1932

1,879,734

UNITED STATES PATENT OFFICE

WALTER G. CHRISTIANSEN, OF BLOOMFIELD, NEW JERSEY, AND EUGENE MONESS, OF NEW YORK, N. Y., ASSIGNORS TO E. R. SQUIBB & SONS, OF NEW YORK, N. Y., A CORPORATION OF NEW YORK

OBTAINMENT OF VITAMIN CONCENTRATES FROM FATS

No Drawing.      Application filed September 18, 1928. Serial No. 306,782.

Our invention relates to the obtainment of vitamin concentrates from fats.

Various fats, particularly cod-liver oil and wheat-germ oil, are known to contain in their unsaponifiable fraction certain vitamins prized for their prophylactic and therapeutic efficacy against suspension of growth, xeropthalmia, rachitis, and other abnormal conditions. Since the media in which these vitamins naturally occur, cod-liver oil for example, are often dietetically objectionable by reason of their unpalatability, the difficulty many people have in ingesting them, and their high content of inert material, it has been found desirable to prepare concentrates of the vitamins, for consumption in tablet or other convenient form or after incorporation with medicinal or food products. Processes hitherto employed for the preparation of such concentrates have been characterized by incomplete recovery of the active substances and by procedural complications giving rise to manipulative difficulties and waste of time.

It is the object of our invention to provide a method of treating fatty substances which, though of the utmost simplicity and facility, shall be thoroughly efficient and expeditious, and shall yield substantially all the vitamins, largely freed from inert material.

Our process comprises essentially the steps of adding to the fat a volatile medium, preferably acetone, that mixes with the fat and readily dissolves the vitamins but does not dissolve soap; then saponifying preferably with sodium hydroxide; and filtering and evaporating the filtrate. No soap or fatty acids are present in the product thus obtained. Since exposure to oxygen causes a vitiation of the vitamins, the process is preferably conducted under anaëric conditions, and oxygen-free reagents are employed. As will be observed, the saponification and the extraction of the vitamins proceed concurrently in the same medium, and thereafter only filtration and evaporation are necessary.

For example, to 700 cubic centimeters of freshly distilled acetone in a two-liter round-bottom flask we may add 15 cubic centimeters of water in which 25 grams of sodium hydroxide has been dissolved, the alkali solution forming a lower layer in the flask. In the acetone 100 grams of cod-liver oil is dissolved, and, the whole being continuously stirred, flakes of soap form at the interface, without, however, interfering with the reaction. Saponification is complete in about five hours at room temperature. Then the mushy mass is filtered, and the residue pressed dry, on a Buechner's funnel, giving a golden-brown filtrate. The residue is now transferred to a beaker and agitated with 700 cubic centimeters more of acetone, and filtered into the vessel containing the first filtrate. These combined filtrates are evaporated on the steam-bath and finally distilled to dryness in vacuo, yielding a concentrate weighing about 7 grams and containing substantially all the vitamins originally present in the fat. During the whole process, the reaction mixture is protected by an atmosphere of nitrogen, and oxygen-free reagents are used.

Within the scope of the appended claims, various changes may be made in the substances treated and the reagents and procedures employed, without departing from our invention or sacrificing any of the advantages thereof.

We claim:

1. In obtaining a vitamin concentrate from fats, the step of saponifying the fat in acetone with a non-alcoholic alkali-metal hydroxide.

2. In obtaining a vitamin concentrate from fats, the step of saponifying the fat in acetone with nonalcoholic sodium hydroxide.

3. The method of obtaining a vitamin concentrate from fats that comprises adding acetone to the fat, saponifying with non-alcoholic sodium hydroxide, filtering, and evaporating.

4. The method of obtaining a vitamin concentrate from fats that comprises adding acetone to the fat, saponifying with non-alcoholic sodium hydroxide, filtering, and evaporating, an atmosphere of nitrogen being maintained around the reaction mixture throughout the process, and oxygen-free reagents being employed.

In testimony whereof we affix our signatures.

WALTER G. CHRISTIANSEN.
EUGENE MONESS.